Feb. 11, 1958     R. V. PATRICK     2,822,932
MATERIAL HANDLING APPARATUS
Filed July 18, 1955     5 Sheets-Sheet 1
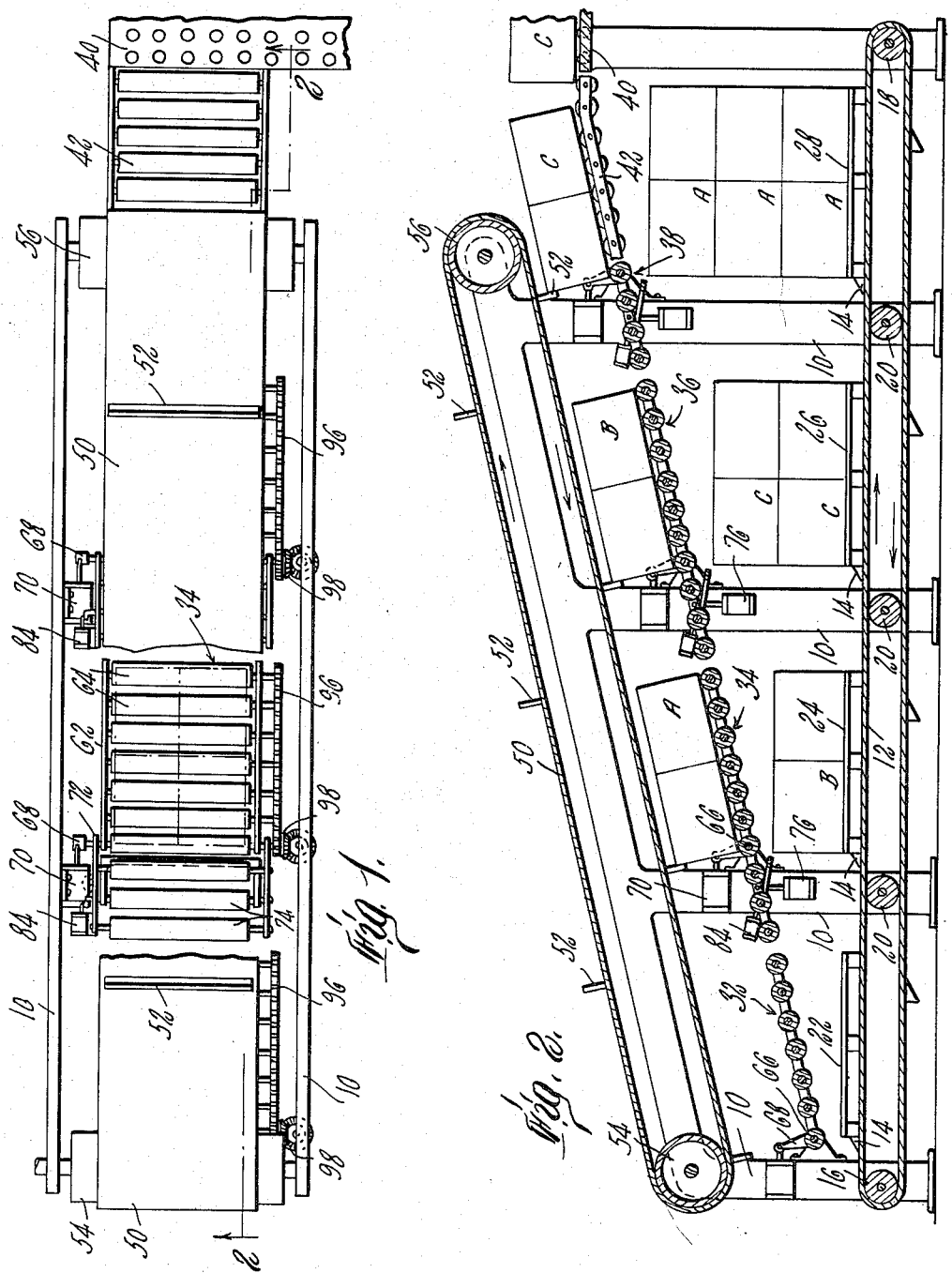

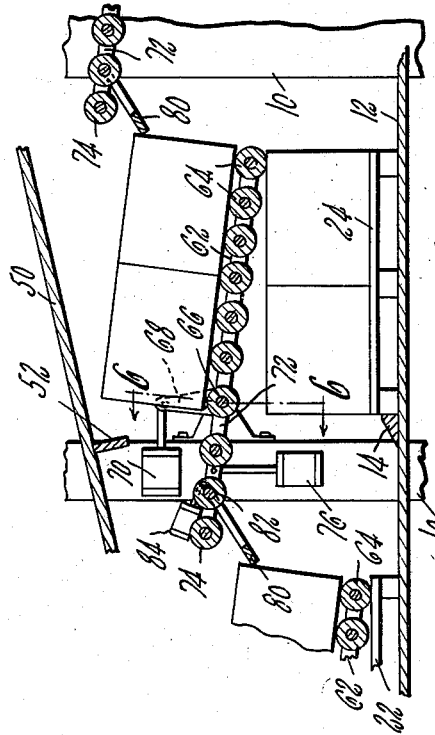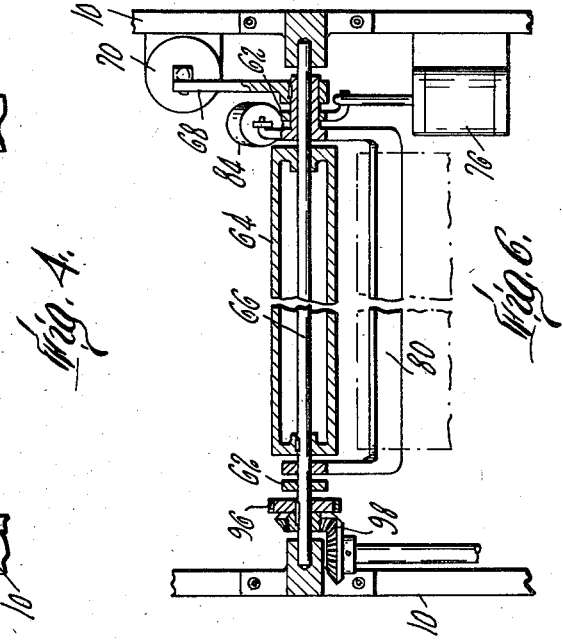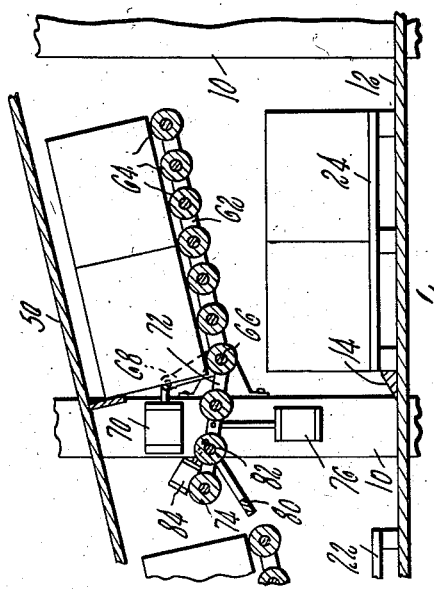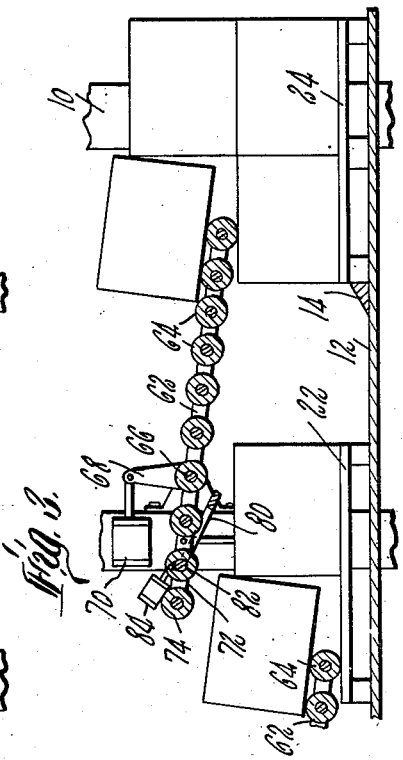

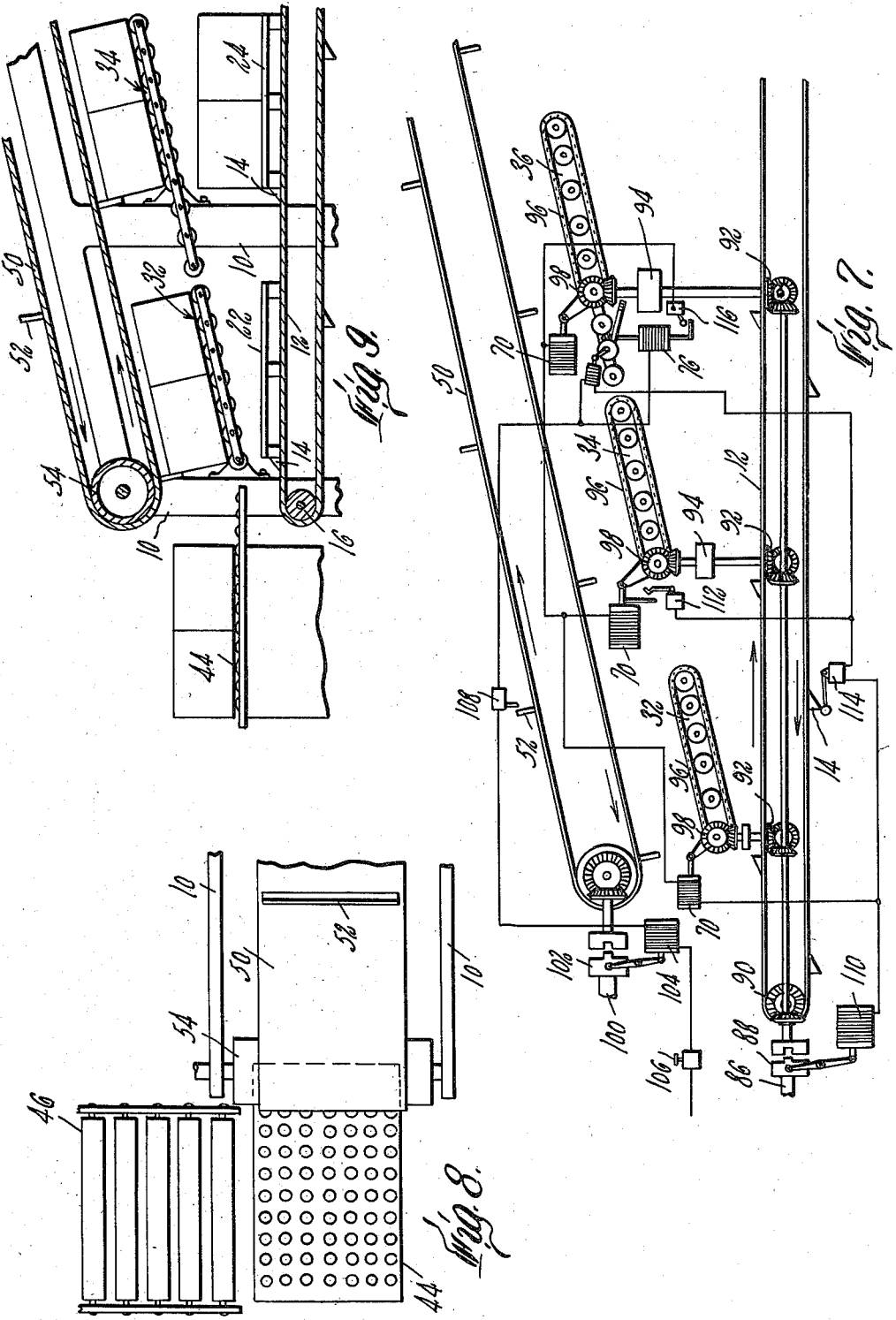

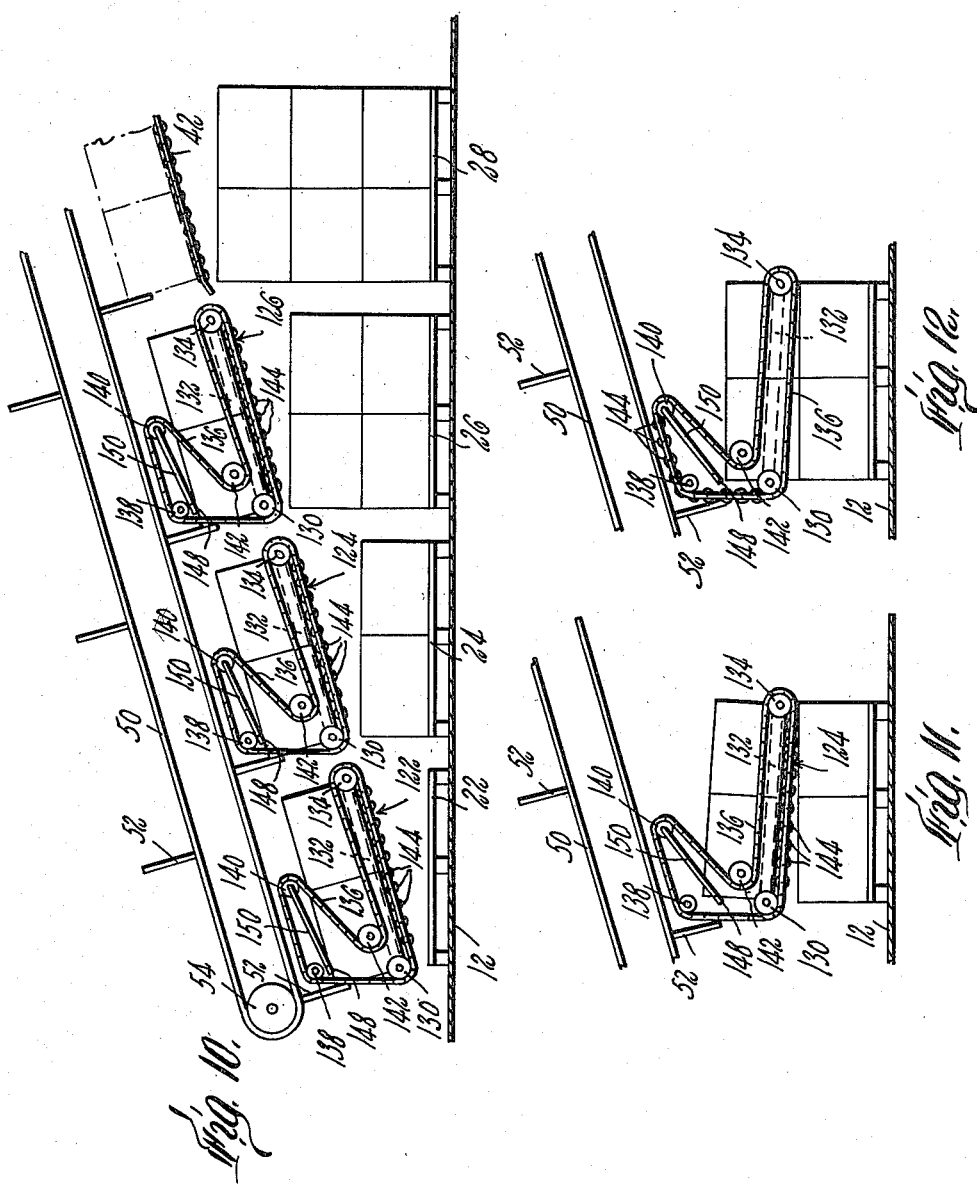

Feb. 11, 1958 R. V. PATRICK 2,822,932
MATERIAL HANDLING APPARATUS
Filed July 18, 1955 5 Sheets-Sheet 5
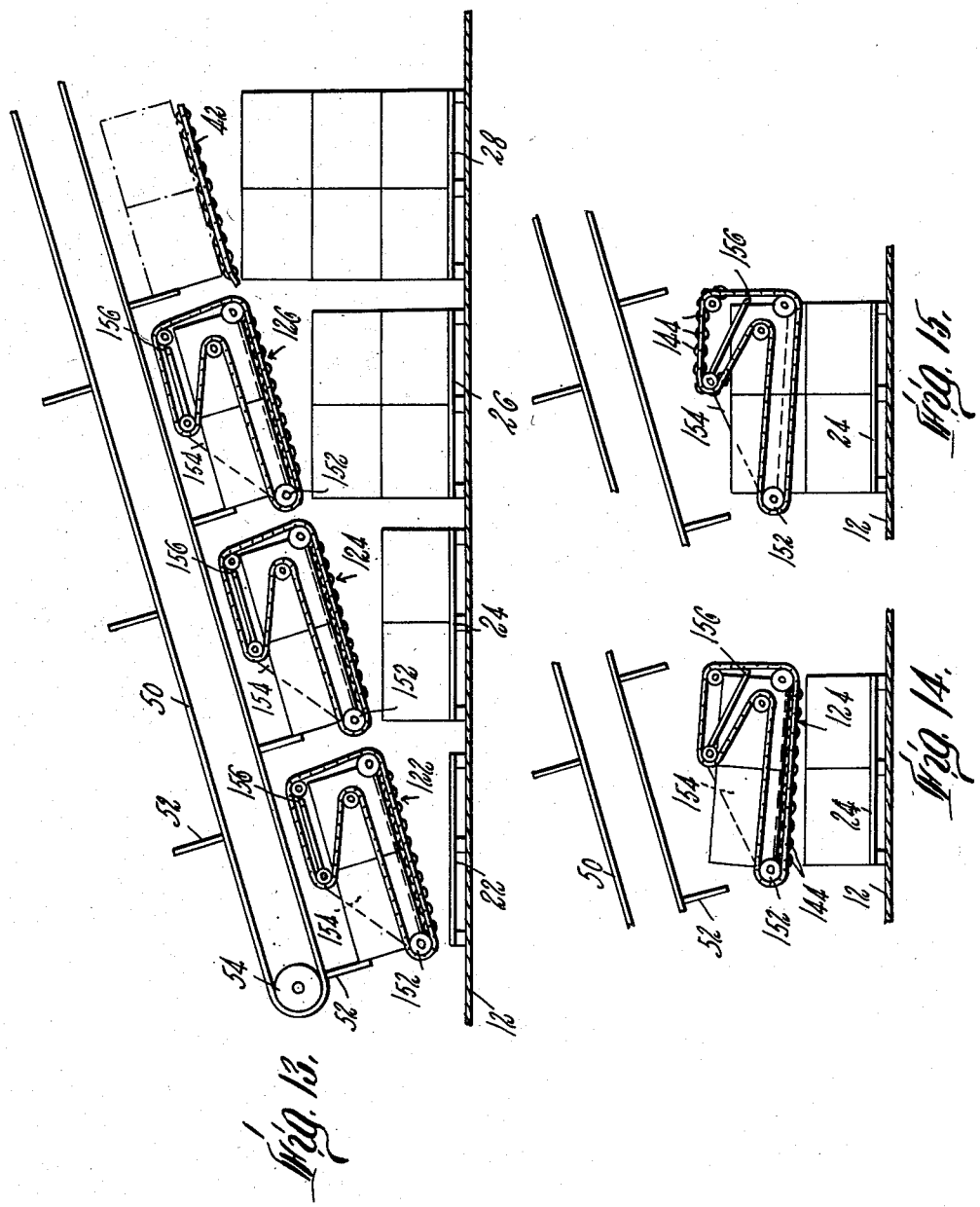

United States Patent Office 2,822,932
Patented Feb. 11, 1958

2,822,932

MATERIAL HANDLING APPARATUS

Rowland V. Patrick, Winchester, Mass., assignor, by mesne assignments, to J. W. Greer Company, Wilmington, Mass., a corporation of Massachusetts Application July 18, 1955, Serial No. 522,453

18 Claims. (Cl. 214—6)

This invention relates to material handling apparatus and has for its primary object the production of automatic apparatus for vertically superimposing multi-unit horizontal layers of goods one upon another to provide a multi-tiered stack of multi-unit layers deposited preferably upon an underlying support such as a pallet, skid or the like.

It is an object of the invention to provide such a pallet loader which has a plurality of horizontally-spaced supports forming discharging stations for goods preferably fed from a common station, the supports operating to discharge goods at successively higher levels preferably simultaneously onto a plurality of pallets. The pallets are moved in single file from a pallet receiving station adjacent one support to a pallet receiving station adjacent the support discharging at the next higher level for receiving on top of the previously discharged units, further units to thus provide a multi-tiered, multi-unit loaded pallet. Hence, the apparatus is capable of accommodating a plurality of pallets or other receiving devices, so that there will be a pallet at each receiving station for receiving the separate goods discharged from the several discharging stations.

In pallet loaders known to me, there has never been provision for the loading of more than one pallet at a time. Hence, if it were desired to load a pallet fully with identical goods, the machine had to devote its operation to the loading of that kind of goods until a full pallet load has been secured. Meanwhile, other types of goods had to be accumulated. Hence, according to the usual practice, a specific kind of goods was not fed into the machine until there was present at the feed end of the machine a sufficient number of identical units so that the pallet load could be completed.

According to my invention, by the provision of horizontally-spaced multiple discharging stations operating at successively increasing levels in the direction of pallet movement, it is possible to feed to the machine from a common station a variety of goods and to so arrange the feeding that each pallet will still be loaded with identical goods, but with different pallets receiving different goods. Commercially, this means that one does not need to have available at the feed end of the machine a complete pallet load of identical goods before a change can be made in the type of goods fed to the machine. One needs to have available at the feed end of the machine only a sufficient number of identical goods to supply a single tier of the pallet loader before a change can be made in the type of goods.

In one form of my invention, the goods are discharged onto a plurality of pallets as they proceed in single file motion beneath the discharging stations. In another form of the invention, the pallets are, during the discharging operation, maintained in stationary position beneath the respective discharging stations, and are simultaneously moved from one station to the next station while the discharging stations are being charged with the next groups of units.

In all forms of the invention, the successive discharging stations are located at different levels so that at a succeeding discharge station, units are discharged onto the top of goods discharged at the immediately preceding station.

The above and other objects of the invention will be more fully understood when taken in connection with the following description of various forms of apparatus embodying the principles of my invention, shown in the accompanying drawings wherein:

Fig. 1 is a plan view, partially broken away, of the apparatus of my invention;

Fig. 2 is a side elevation of the apparatus of Fig. 1;

Figs. 3 through 5 are detail side elevations of a portion of the apparatus of Figs. 1 and 2 showing three steps in the operation thereof;

Fig. 6 is a cross-sectional end elevation of a portion of the apparatus of Figs. 1 and 2;

Fig. 7 is a diagrammatic side elevation of the control and drive means of the structure of Figs. 1 and 2;

Fig. 8 is a plan view of a modified form of the apparatus of Figs. 1 and 2;

Fig. 9 is a side elevation of the modification of Fig. 8;

Fig. 10 is a diagrammatic side elevation showing another form of the apparatus of the invention;

Figs. 11 and 12 are side elevations of a portion of the apparatus of Fig. 10 showing two steps in its operation;

Fig. 13 is a diagrammatic side elevation of a modified form of the apparatus of Figs. 10 through 12; and Figs. 14 and 15 are side elevations of a portion of the apparatus of Fig. 13 showing two steps in its operation.

Referring to Figs. 1 through 7, the materials handling apparatus of the invention in general includes a frame having a plurality of vertical members 10. At the bottom of said frame is mounted a generally horizontal conveyor for moving pallets in single file to and from the first receiving station to the second and thence to the third. The conveyor includes a belt 12 having a plurality of upstanding dogs 14 on its upper flight for defining the distance between said receiving stations, said belt being trained around a supporting roll 16 at one end of the frame and another supporting roll 18 at the other end thereof and being driven by means hereinafter described. Intermediate supporting rolls 20 are preferably provided between said rolls 16 and 18. A plurality of pallets are positioned on the upper flight of said conveyor belt 12 against the leading sides of dogs 14, pallet 22 being shown in Fig. 2 at the first receiving station, pallet 24 at the second, and pallet 26 at the third, the fully loaded pallet 28 being in position to be conveyed from the machine.

A plurality of horizontally-spaced supports, generally designated 32, 34 and 36 forming pallet discharging stations are mounted on frame members 10 at successively increasing levels above the pallet receiving stations for discharging onto unloaded and partially loaded pallets, successive tiers of units to fully load a pallet. The supports are tiltable as hereinafter more fully explained so that in their upwardly tilted position as shown in Fig. 2, they form an extended sloping conveyor for feeding tiers of units from a common station, but when tilted to a somewhat downward position (Figs. 4 and 5) they act as discharging stations to discharge the units supported thereon onto the pallets. The common station provided at the upper end of the sloping conveyor formed by said supports in their upwardly tilted position comprises a ball table 40 having a short section of roller conveyor 42 leading downwardly therefrom toward the upper tilting support 36.

An overlying control belt 50, having downwardly extending stop members 52 for moving downwardly along the sloping conveyor and positioning on said supports 32, 34 and 36 tiers of units fed downwardly from ball table 40, is mounted on frame members 10 above said supports generally parallel with said supports in their upwardly tilted conveying position and suitably spaced therefrom. Said belt is mounted on suitable rolls 54 and 56 at opposite ends of the machine frame and is driven as hereinafter more fully described.

The tiltable supports 32, 34 and 36 each consist of a pair of side member 62 having mounted therebetween a plurality of conveyor rolls 64, said side members being pivoted at their end away from the direction of conveyor movement on frame member 10 for pivotal movement about a pivot shaft 66. For tilting said side members with their rolls from their conveying position (Fig. 3) to their lowered discharging position (Figs. 4 and 5), a crank arm 68 is provided on said member, said crank arm being moved by a suitable hydraulic cylinder structure 70. A rear tiltable portion is also provide for each of said supports, together with an additional portion 38 between support 36 and the lower end of roller conveyor 42. Said portions each comprise a pair of arms 72 having extending therebetween a plurality of rolls 74, the arms being pivotally mounted at one end away from the direction of pallet movement for tilting about said pivot shaft 66. A hydraulic cylinder structure 76 is provided for tilting said arms 72 independently of the supports.

A stop bar 80 is mounted on said rear portion for swinging movement therebeneath about a pivot 82 from an operative downwardly and rearwardly extending position to an inoperative forwardly extending position, in order to provide a holding means to limit movement in the direction of pallet travel of the units being loaded. The stop bar is moved between said positions by a hydraulic cylinder structure 84. The hydraulic cylinders 70, 76 and 84 are fastened to the frame of the machine, either directly to the vertical members 10, or on brackets (not shown) affixed thereto.

For driving the above described materials handling apparatus, a shaft 86, driven by any suitable means (not shown) is arranged for driving through a clutch 88, roll 16 and rolls 20 through bevel gears 90 mounted thereon. Said rolls, in turn, drive a plurality of bevel gears 92 arranged for driving through one-way clutches 94 the rolls 64 of tilting supports 32, 34 and 36, said rolls of each support having a common chain drive 96 driven by bevel gears 98 from a one-way clutch 94. The clutches are arranged to drive only in the direction of pallet movement, rolls 64 being free to rotate in the opposite direction. The upper belt 50 is driven through its roll 54 by means of a shaft 100, driven by any suitable means, not shown, and a clutch 102.

The clutches 88 and 102 and the hydraulic cylinders 70, 76 and 84 are controlled by suitable electric circuits to provide automatic operation of the machine as hereinafter described. Thus, clutch 102 is operated by a solenoid 104, which, in turn, is controlled by operator switch 106 and by a switch 108 mounted to be actuated by contact with a stop 52 on overlying belt 50. Said switch 108 is also connected to actuate, upon stopping of said belt, hydraulic cylinder structures 76 for tilting the rear portions of the supports and to actuate hydraulic cylinder structure 84 for moving stop bar 80 to its operative position. A switch 116 responsive to the discharging position of the rear portions of supports 32, 34 and 36 is connected to hydraulic cylinder structure 70 for tilting said supports to their discharging position. The clutch 88 is operated by solenoid 110 which is connected to a switch 112 responsive to the discharging position of supports 32, 34 and 36 and to a switch 114 actuated by contact with a dog 14 on a pallet conveyor belt 12. The switch 112 also is connected to stop bar hydraulic cylinder structure 84 to swing the stop bar 80 to inoperative position at an appropriate stage of the cycle and the switch 114 is also connected to hydraulic cylinder structure 70 to raise the supports 32, 34 and 36 to their conveying position for a new cycle.

In operation, the units, for example, cardboard cartons, are assembled in a desired pattern on ball table 40 by an operator to form a tier, and with the supports 32, 34 and 36 and their rear portions in the position in which they form a continuous gravity conveyor, an assembled tier is then pushed down conveyor 42, until its progress is interrupted by the upper most stop 52. Operator switch 106 is then actuated to engage clutch 102 by its solenoid 104 to move the tier downwardly along the sloping conveyor to the uppermost discharging station, switch 108 disengaging clutch 102 at said station by contact with a stop 52. Another tier is then assembled and positioned against the uppermost stop, and once again the switch 106 is actuated to move the assembled tiers downwardly one station. Then with the machine loaded at each tier discharging station except the lowest one on support 32, and with the unloaded and partialy loaded pallets 22, 24 and 26 as their receiving stations underlying the tilting supports all as shown in Fig. 1, the operator switch 106 is actuated to start the cycle. Said switch engages clutch 102 by its solenoid 104 to drive top conveyor belt 50 to allow the assembled units to move downwardly to advance them one station to load the lowest discharging station. When a stop 52 contacts switch 108 upon the third advance of conveyor 50, clutch 102 is again disengaged, but this time the hydraulic cylinder structure 76 is also actuated to swing the rear portions of the supports to their discharging position. Simultaneously, hydraulic cylinder structure 84 is actuated to swing the stop bars 80 into operative position to prevent movement of the assembled tiers at the discharging stations in the direction of pallet movement. Thus, at this stage in the cycle, an assembled tier of units is positioned on support 32 over an empty pallet 22, a tier of units is positioned on support 34 over a pallet 24 having one tier of units thereon; and a third tier of units is positioned on support 36 over a pallet 26 having two tiers thereon.

The discharge positioning of the rear portions by hydraulic cylinder structure 76 actuates switch 116, which causes the hydraulic tilting cylinder structures 70 to tilt supports 32, 34 and 36 to their discharging position. When they reach their discharging position, switch 112 is actuated to operate stop bar hydraulic cylinder structure 84 to swing the stop bar 80 to inoperative position and clutch 88 is simultaneously engaged by its solenoid 110 to drive the pallet conveyor belt 12 and the rolls 64 of the supports 32, 34 and 36 at synchronous speeds to simultaneously discharge each of the tiers of units onto a pallet as it moves past a support in the same direction as the units are moved by the rolls 64. The pallet continues to move until it reaches the next receiving station, where it is stopped by the contact of a dog 14 with switch 114 which switch also operates tilting cylinder structures 70 to return the supports to their upward conveying position. When they reach that position, operator switch 106 may then be operated to start the cycle again, a new group of units being loaded behind the uppermost stop 52 before the switch is operated.

As the operation continues, empty pallets are positioned on the infeed end of conveyor 12 against the leading side of a dog 14 either manually or by suitable automatic means and each such pallet will be loaded with a first tier by support 32, with a second tier by support 34, and with a third and final tier by support 36. The fully loaded pallets 28 then pass from the machine.

As pointed out hereinabove, it is possible to feed to the machine from the common station a variety of goods and to so arrange the feeding that each pallet will still be loaded with identical goods, but with different pallets receiving different goods. Assume three types of units, A, B and C, to be loaded on pallets to provide pallets loaded with identical units. To accomplish this result, each tier of units is made up of identical units, so that the tiers consist entirely of units A, B or C. Then, so that the pallets moving from the machine will be loaded in sequence with units as follows CBA, CBA . . . (Fig. 1), the sloping conveyor must be loaded with tiers as follows ABC, CAB, BCA, ABC, CAB, BCA, . . . ; other sequences will provide pallets loaded with various mixtures of units A, B and C.

Referring now to Figs. 8 and 9, a modification of the apparatus of Figs. 1 through 7 is shown wherein the apparatus is fed from its lower rather than its upper end. Thus, a ball table 44 having an input conveyor 46 is positioned at the lowest end of the frame and the direction of movement of the upper conveyor belt 50 is reversed so that the tiers of units are moved upward along the sloping conveyor by the stops 52 on said belt rather than moving downward by gravity. In this structure, too, the driving means for the rolls 64 of the supports include overrunning clutches, rather than one-way clutches, so that tiers of units may freely be moved up the conveyor formed by the upwardly tilted supports. In operation, this structure is essentially the same as that described above, except that the direction of travel of the tiers of units from the common station at ball table 44 to the discharging stations at supports 32, 34 and 36 is reversed.

In Figs. 10 through 15 is diagrammatically shown another form of the invention wherein the pallets are, during the discharging operation, maintained in stationary position beneath the respective discharging stations, and are simultaneously moved from one receiving station to the next receiving station while the discharging stations are being charged with the next tier of units. In general, in the structure shown in Figs. 10 through 12 and in the somewhat modified structure of Figs. 13 through 15, a stripper type of support is employed wherein the stripper rolls supporting the units at a discharging station are stripped from beneath said units while the units are held in stationary position by suitable means such as a stripper bar. This operation deposits the units onto the single file of pallets while said pallets are maintained in stationary position beneath the discharging stations. Such discharging stations as before are at successively higher levels to load a pallet with a plurality of layers as the pallet proceeds through the machine.

Referring specifically to the structure shown in Figs. 10 through 12, the support members 122, 124 and 126 each comprises a series of chain sprockets mounted on opposite sides of the machine frame, with a flight of chain trained around the sprockets of each series. Said sprockets preferably are five in number and are arranged to provide a lower supporting and conveying flight and an upper storage flight for the supporting rolls which extend transversely between the chains.

In more detail, a fulcrum sprocket 130 is mounted on the machine frame, with an arm 132 pivotally mounted on the axis thereof extending in the direction of pallet movement. Said arm supports at its free end another sprocket 134, said sprockets 130 and 134 forming the supports for the lower flight of an endless chain 136 trained around the series of sprockets. A pair of upper sprockets 138 and 140 are mounted on the machine frame above said sprockets 130 and 132, and a guiding and tensioning sprocket 142 is resiliently mounted in the vicinity of the fulcrum sprocket 130 to allow pivotal movement of sprocket 134 without change in chain tension. Thus, with the chains 136 trained around the series of sprockets and with supporting rolls 144 occupying the lower flight of said chains between sprockets 130 and 132, the supports 122, 124 and 126 are formed by the said rolls. A stripper bar 148 is pivotally mounted on the end of stripper bar arms 150 for swinging movement about the axis of the higher upper sprocket 140, said bar itself being in its raised inoperative position located in the vicinity of the lower of the upper sprockets 138, and in its lowered operative position well beneath said sprocket 138 to engage the end of a tier of units to hold it in position.

Suitable driving and control means are provided for operating the apparatus: to move the overlying belt 50 with its stops 52 to lower a tier of units and to stop them in the desired position on supports 122, 124 and 126; to tilt the arms 132 from their upwardly sloping conveying position to their discharge position and to position the stripper bars 148; to rotate the fulcrum sprocket 130 to strip the stripper rolls 144; and to intermittently move the lower conveyor belt 12 with the pallets 22, 24 and 26 thereon to the succeeding receiving station while the supports 122, 124 and 126 are again being loaded. Such apparatus comprises suitable hydraulic cylinder structures, clutches, switches and the like, all operating in time relationship similarly to that hereinbefore described.

In operation, with the supports 122, 124 and 126 tilted upwardly in their conveying position and with the supporting rolls 144 in position between sprockets 130 and 134 to form a continuous conveyor along the lower flights of chains 136, tiers of units may be moved downwardly by overlying belt 50 and its stops 52 from a common feeding station as hereinabove described. With each of the discharging stations loaded with a tier of units, the arms 132 carrying forward sprockets 134 may be tilted to discharging position, in which position stripper bar 148 is moved into contact with the edge of the assembled units away from the direction of pallet conveyor movement. With the assembled tiers of units thus restrained against rearward movement, the chains 136 are moved by rotating fulcrum sprocket 130 to strip the rolls 144 from beneath the units in the direction in which movement of the units is restrained by the stripper bar 148, the rolls thus passing from the lower flight around fulcrum sprocket 130 onto the upper flight. The tiers of units being no longer supported, drop downwardly onto a pallet (whether unloaded or loaded) maintained in stationary position at a receiving station beneath the supports. The pallets are then advanced to the next receiving station, the sprocket support arms 132 swung upwardly to their conveying position and the stripper bar to its inoperative position, and the fulcrum sprocket 130 rotated to move the supporting rolls 144 to the lower flight of chains 136 to form again a continuous sloping conveyor. The machine cycle may then be repeated.

The structure as shown in Figs. 13 through 15 is somewhat modified from that immediately above described in that the stripper support structure is, in effect, in a reverse position with all of the chain supporting sprockets, except the fulcrum sprocket 152 mounted on an arm 154 for swinging movement between an upwardly tilted conveying position and a discharging position. In this structure, the stripper bar 156 is located at the end of the support in the direction of conveyor movement and the supporting rolls are then moved in such direction while a pallet is maintained in stationary position beneath them. Operation is as before except that direction of stripping movement is reversed.

Thus, it will be seen that I have provided a novel automatic pallet loader having a plurality of horizontally-spaced supports operating at successively higher levels to provide discharging stations for loading pallets moved in single file from a lower station to a higher station. Various modifications of my invention, not herein described, within the spirit thereof and the scope of the appended claims will occur to those skilled in this art.

I claim:

1. Apparatus for loading units into multi-tiered stacks of multi-unit layers comprising a plurality of horizontally-spaced conveyor supports at successively increasing levels, each of said supports being tiltable about an axis to lie in one position in a common plane and forming an extended sloping conveyor and in another position in different planes to form a plurality of discharging stations for discharging at different levels units held on said supports, overlying means for positioning groups of units on said conveyor, underlying conveyor means for moving a group of units discharged at one level from one support to a position adjacent the support discharging at the next higher level for receiving on top of the discharged units further units to be discharged from the last-named support, and control and driving means for first operating said overlying means to position said units on said supports, next tilting said supports, then discharging said units from said supports and advancing said underlying conveyor.

2. Apparatus as claimed in claim 1 further including means for maintaining said units on said supports while in said positions providing a plurality of discharging stations, and wherein said control and driving means includes means for moving said unit-maintaining means to inoperative position for releasing said units from said supports.

3. A loading machine for loading units into multi-tiered stacks of multi-unit layers on pallets and the like comprising two vertically spaced superposed conveyors, the underlying conveyor being adapted to support and advance a succession of pallets or the like to be loaded, and the overlying conveyor being inclined upwardly relative to the underlying conveyor in the direction of the advance of said pallets or the like on said underlying conveyor, said overlying conveyor being sectionalized with certain sections thereof being movable out of their normal common plane of inclination to lower the upper end of each section into a discharging position, the upper ends of the successive sections in discharging positions being at progressively different levels, means for feeding articles along said inclined conveyor from one end thereof to position separate spaced groups of unstacked articles on each of said sections and means for dropping said sections to discharging positions for simultaneous discharge of the groups of articles from all of said sections onto a plurality of pallets or the like spaced along said underlying conveyor and means for driving said underlying conveyor to advance a group of articles discharged from one of said sections at a lower level to a position to receive on top thereof further articles to be discharged from the next higher section at a higher level after reloading of said sections.

4. A loading machine as claimed in claim 3, wherein the movable sections of the overlying conveyor are pivoted for tilting movement to and from discharging positions.

5. A loading machine as claimed in claim 3 wherein the said overlying conveyor is a sectionalized roller conveyor.

6. A loading machine as claimed in claim 3 wherein said driving means for the underlying conveyor drives said underlying conveyor while the articles are being discharged from said overlying conveyor sections.

7. A loading machine as claimed in claim 3 wherein the article feeding means includes a series of spaced stop members suspended over said overlying conveyor and movable along a path substantially parallel to said overlying conveying in a direction for carrying articles, supplied to the overlying conveyor from one end thereof in groups, to spaced positions supported on said sections.

8. A loading machine as claimed in claim 7 wherein the stop members are mounted between endless chains for movement in an endless path.

9. A loading machine as claimed in claim 7 wherein the stop members are mounted between endless chains for movement in an endless path, and means for driving said chains in a direction to carry articles upwardly on said overlying conveyor from the bottom thereof.

10. A loading machine as claimed in claim 3 having stop bars extending into the discharging path of articles positioned on said sections when said sections are dropped to discharging positions for preventing inadvertent discharge of articles therefrom, and driving means for withdrawing said stop bars from said discharging paths periodically to permit discharge of said articles.

11. A loading machine as claimed in claim 10, wherein the drive means for said underlying conveyor and for said stop bars are synchronized to withdraw said stop bars as said conveyor commences to advance a succession of pallets or the like beyond predetermined points of advance substantially beneath the discharge ends respectively of said sections.

12. A loading machine as claimed in claim 3 wherein each of said sections includes a series of supporting rollers and power means for driving at least some of said rollers to discharge units from said sections.

13. A loading machine as claimed in claim 3 wherein said driving means drives said underlying conveyor intermittently to bring a succession of pallets or the like into stationary positions directly beneath the said sections and wherein the said sections comprise a series of rollers mounted between endless chains, and means for driving said endless chains to withdraw the rollers from beneath the groups of articles supported thereon to drop said articles onto the stationary pallets positioned therebeneath.

14. A loading machine as claimed in claim 13 wherein said sections are provided, in discharging position, with stripper bars for insuring relative movement between said articles and said rollers as the rollers are withdrawn from beneath said articles.

15. A loading machine as claimed in claim 13 wherein the roller withdrawing means withdraw the rollers rearwardly from beneath the articles, and said sections are provided, in discharging position, with stripper bars located at the rearward ends of said sections with respect to the direction of advance of the underlying conveyor for insuring relative movement between said articles and said rollers as the rollers are withdrawn rearwardly from beneath said articles.

16. A loading machine as claimed in claim 13 wherein the roller withdrawing means withdraw the rollers in a forward direction from beneath said articles, and said sections are provided in discharging position, with stripper bars located at the forward ends of said sections with respect to the direction of advance of the underlying conveyor for insuring relative movement between said articles and said rollers as the rollers are withdrawn forwardly from beneath said articles.

17. A loading machine for loading units into multi-tiered stacks of multi-unit layers on pallets and the like comprising two vertically spaced superposed conveyors, the underlying conveyor being adapted to support and advance a succession of pallets or the like to be loaded, and the overlying conveyor being inclined upwardly relative to the underlying conveyor in the direction of the advance of said pallets or the like on said underlying conveyor, said overlying conveyor being sectionalized with certain sections thereof being movable out of their normal common plane of inclination to lower the upper end of each section into a discharging position, the upper ends of the successive sections in discharging positions being at progressively higher levels, means for feeding articles along said inclined conveyor from one end thereof to position separate spaced groups of unstacked articles on each of said sections and means for dropping said sections to discharging positions for simultaneous discharge of the groups of articles from all of said sections onto a plurality of pallets or the like spaced along said underlying conveyor, stop means movable into and out of the paths of discharge of said articles from said sections, means for driving said underlying conveyor to advance a group of articles discharged from one of said sections at a lower level to a position to receive on top thereof further articles to be discharged from the next higher section after reloading of said sections, and power drives for said feeding means, said tilting means and said stop means and automatic control means for actuating said section dropping means responsive to completion of loading of said sections by said feeding means, for actuating said stop means and said underlying conveyor drive means responsive to completion of dropping movement of said sections, and for stopping said underlying conveyor after the completion of discharge of said articles.

18. A loading machine for loading units into multi-tiered stacks of multi-unit layers on pallets and the like comprising two vertically spaced superposed conveyors, the underlying conveyor being adapted to support and advance a succession of pallets or the like to be loaded, and the overlying conveyor being inclined upwardly relative to the underlying conveyor in the direction of the advance of said pallets or the like on said underlying conveyor, said overlying conveyor being sectionalized with certain sections thereof being movable out of their normal common plane of inclination to lower the upper end of each section into a discharging position, the upper ends of the successive sections in discharging position being at progressively higher levels, means for feeding articles down said inclined conveyor from the upper end thereof to position separate spaced groups of said articles on each of said sections and means for dropping said sections to discharging positions for simultaneous discharge of the groups of articles of all of said sections in the opposite direction from their direction of feed onto a plurality of pallets or the like moving in spaced relation on said underlying conveyor in a counter direction to the direction of feed of said articles down said overlying conveyor.

References Cited in the file of this patent

UNITED STATES PATENTS

| | | |
|---|---|---|
| 1,493,480 | De Tour | May 13, 1924 |
| 2,065,674 | Fay | Dec. 29, 1936 |
| 2,704,593 | Galloway | Mar. 22, 1955 |

FOREIGN PATENTS

| | | |
|---|---|---|
| 528,136 | France | Nov. 7, 1921 |